United States Patent
O'Neil et al.

(10) Patent No.: US 12,198,415 B2
(45) Date of Patent: Jan. 14, 2025

(54) SYSTEM, DEVICES AND/OR PROCESSES FOR APPLICATION OF KERNEL COEFFICIENTS

(71) Applicant: Arm Limited, Cambridge (GB)

(72) Inventors: Liam James O'Neil, Bedale (GB); Joshua James Sowerby, Twickenham (GB); Samuel James Edward Martin, Waterbeach (GB); Matthew James Wash, Stapleford (GB)

(73) Assignee: Arm Limited, Cambridge (GB)

( * ) Notice: Subject to any disclaimer, the term of this patent is extended or adjusted under 35 U.S.C. 154(b) by 400 days.

(21) Appl. No.: 17/694,352

(22) Filed: Mar. 14, 2022

(65) Prior Publication Data

US 2023/0290131 A1 Sep. 14, 2023

(51) Int. Cl.
G06V 10/82 (2022.01)
G06T 7/90 (2017.01)
G06V 10/25 (2022.01)
G06V 10/50 (2022.01)

(52) U.S. Cl.
CPC ............. *G06V 10/82* (2022.01); *G06T 7/90* (2017.01); *G06V 10/25* (2022.01); *G06V 10/50* (2022.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 11,842,463 B2* | 12/2023 | Sinha | G06N 3/09 |
| 2022/0321830 A1* | 10/2022 | Niklaus | H04N 7/0135 |
| 2023/0281752 A1* | 9/2023 | Novikov | G06T 3/4015 |
| | | | 382/100 |

OTHER PUBLICATIONS

Hasselgren, et al., "Neural Temporal Adaptive Sampling and Denoising," Computer Graphics Forum (Proceedings of Eurographics 2020), https://research.nvidia.com/publication/2020-05_neural-temporal-adaptive-sampling-and-denoising, Published May 25, 2022, 9 Pages.

Thomas, et al., "A Reduced-Precision Network for Image Reconstruction," ACM Trans. Graph., vol. 39, No. 6, Article 231. Publication date: Dec. 2020, 12 Pages.

Hasselgren, et al., "Neural Temporal Adaptive Sampling and Denoising -Supplemental material," EUROGRAPICIS 2020, 2020 The Author(s) Computer Graphics Forum © 2020 The Eurographics Association and John Wiley & Sons Ltd. Published by John Wiley & Sons Ltd., 4 Pages.

\* cited by examiner

*Primary Examiner* — Dov Popovici
(74) *Attorney, Agent, or Firm* — Berkeley Law & Technology Group, LLP

(57) ABSTRACT

Example methods, apparatuses, and/or articles of manufacture are disclosed that may be implemented, in whole or in part, techniques to process pixel values sampled from a multi color channel imaging device. In particular, methods and/or techniques to process pixel samples for interpolating pixel values for one or more color channels.

20 Claims, 5 Drawing Sheets

SYSTEM, DEVICES AND/OR PROCESSES FOR APPLICATION OF KERNEL COEFFICIENTS

BACKGROUND

1. Field

Techniques, devices and processes for application of kernel coefficients to image signal intensity values to impart an effect are described.

2. Information

According to an embodiment, coefficients to be applied to pixel values to impart an intended effect in a processed image are typically arranged in an array as a "kernel." In particular implementations, coefficients arranged in a kernel may be determined and/or optimized for particular intended effects. In one such implementation of a kernel, coefficients may be determined, at least in part, by a kernel prediction networks (KPN) which may employ one or more neural networks to determine kernel coefficients.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
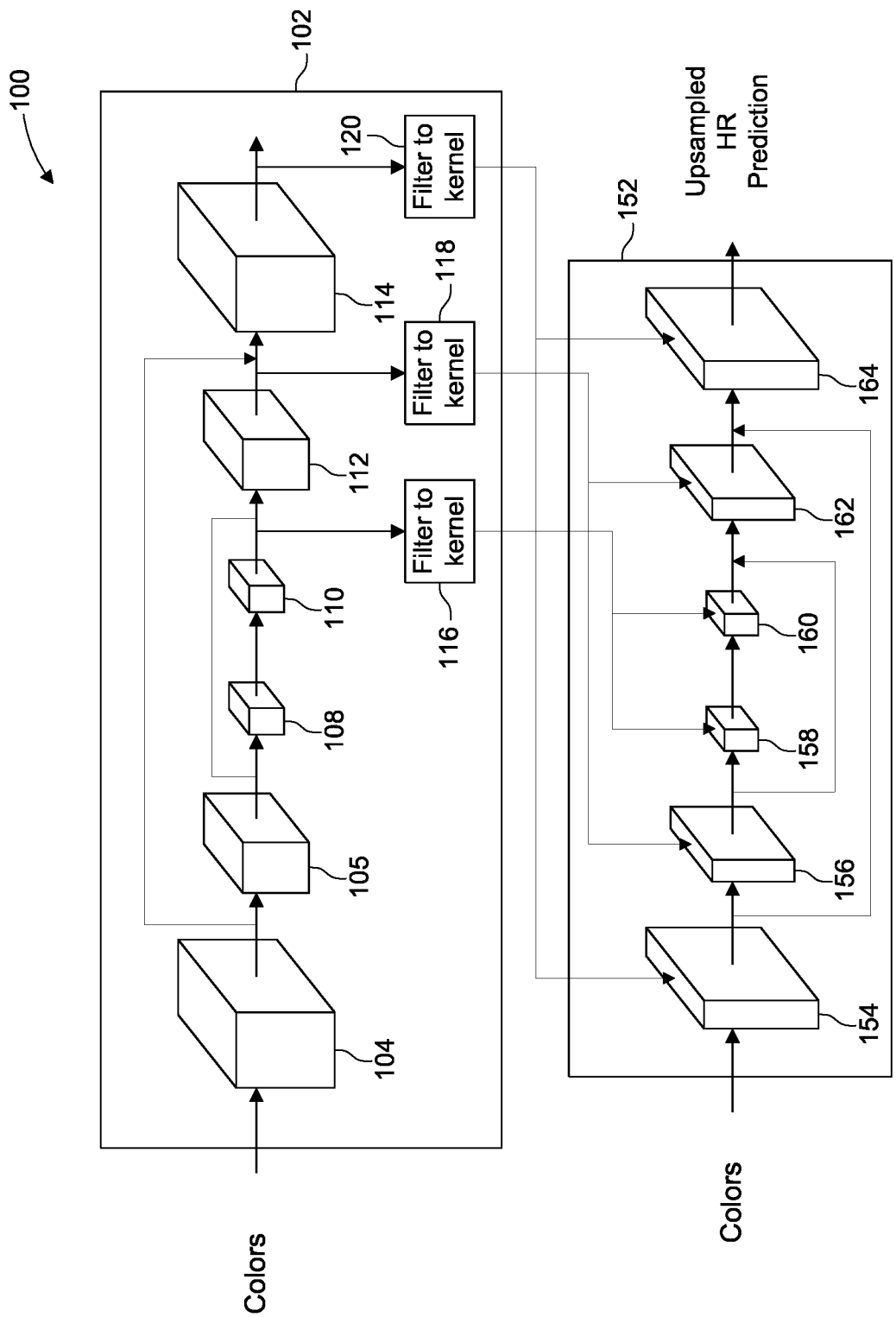
FIG. 1 is a schematic diagram of a kernel prediction network, according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

According to an embodiment, an image processing system may apply a convolutional neural network (CNN) to image observations (e.g., image signal intensity values of an image frame) to predict image signal intensity values in a processed image frame (e.g., for reproducing an image on a display device). With high resolution image processing, however, such application of a CNN for image-to-image reconstruction may be so computational intensive to be impractical. Additionally, for high dynamic range (HDR) content (>8 bits), quantized image-to-image networks may not adequately represent a full HDR range correctly if image signal intensity values are to be quantized to int8. In an embodiment, a kernel prediction network (KPN) may have a separate data path for image signal intensity values, and predicted parameters. As such, image signal intensity values may not be fully quantized, resulting in lost information. A network to predict kernel coefficients, on the other hand, may be quantized heavily. As such, a KPN may be implemented as a less computationally intensive alternative with substantially high quantization.

According to an embodiment, a KPN may compute coefficients of a single kernel to be applied to an entirety of image signal intensity values of an image. In a particular example in which an image is represented as red, blue and green color signal intensity values at pixel locations in the image, such coefficients of a single kernel may comprise a K×K number of coefficients to be applicable for determination of such a color signal intensity value at each pixel location. Consequently, while a KPN may provide some advantages over computationally intensive approaches such as execution of a CNN to predict individual color intensity values of a reconstructed image, a KPN may nonetheless significantly impact computational memory resources (e.g., to store a K×K number of floating point coefficients for each color intensity value at each pixel location and at different scales).

Briefly, one particular implementation is directed to a process to execute one or more neural networks (NNs) to predict coefficients of multiple kernels, wherein predicted coefficients of a first kernel are applicable to a portion of an image and predicted coefficients of a second kernel are applicable to a result of application of predicted coefficients of the first kernel to the portion of the image. Predicted coefficients of first and second kernels may then be applied to signal intensity values of the portion of the image to impart an intended effect to a processed image. Since fewer kernel coefficients may be predicted with two smaller kernels than in one larger kernel, predicting coefficients of multiple kernels for application to signal intensity values of an image may enable significant savings in memory usage.

According to an embodiment, a KPN may be implemented at least in part as two high-level components: a kernel regression component and a light-weight filtering component. The schematic block diagram of FIG. 1 depicts an example implementation of a KPN 100. In the particular illustrated implementation, KPN 100 may comprise a kernel regression network (KRN) 102 to determine kernel coefficients to be applied to image signal intensity values and a light-weight filtering portion 152 to apply kernel coefficients to image signal intensity values at various processing stages. Here, different prediction stages of KRN 102 may predict kernel coefficients to be applied in filtering operations at various processing stages 154, 156, 158, 160, 162 and 164 of light-weight filtering component 152 as shown. As depicted in FIG. 1, a sequence of processing stages 154 and 156 may impart an image downscaling while a sequence of processing stages 162 and 164 may impart an image upscaling to a downscaled image.

In a particular implementation, KRN 102 may determine coefficients 116, 118 and 120 at stages 110, 112 and 114, respectively, as predictions to be computed by one or more neural networks (NNs). For example, such a neural network may include weights associated with nodes having been determined from machine learning operations using back-propagation operations based, at least in part, on application of a loss function to a result of output of filter network after the kernel coefficients have been applied and "ground truth" observations.

According to an embodiment, a processing stage in light-weight filtering portion 152 may apply predicted kernel coefficients in a filtering operation for computing an image signal intensity value for a particular color channel at a particular pixel location based on image signal intensity values of pixel locations local to the particular pixel location. For example, such a processing stage may apply corresponding coefficients to each image signal intensity value for the particular color channel in a K×K pixel region that is centered about the particular pixel location. This may entail maintaining a K×K kernel coefficients per pixel location per color channel, which may strain memory bandwidth in real-time applications.

Figure 2:
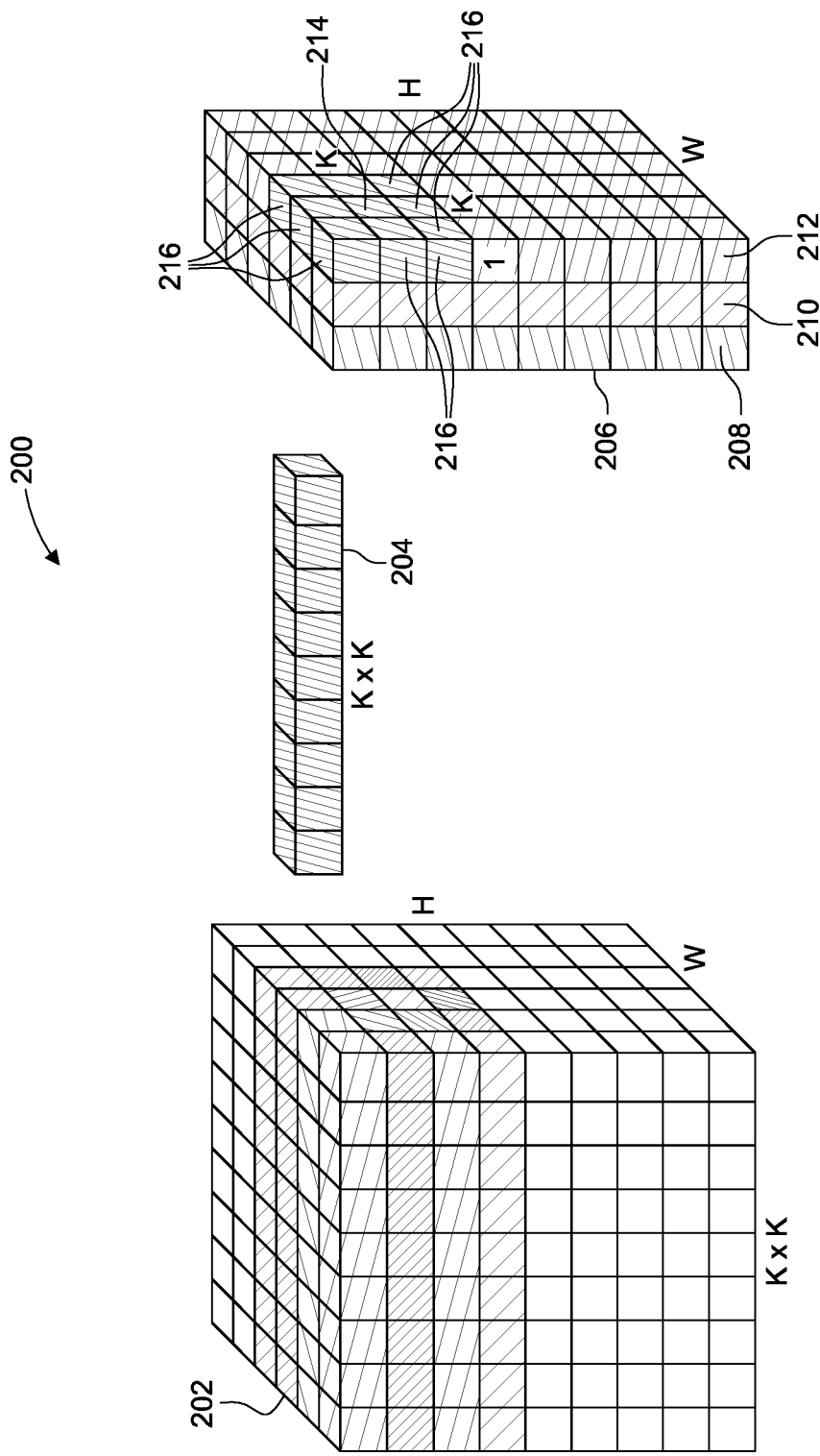
FIG. 2 is a diagram illustrating an application of kernel coefficients to image signal intensity values, according to an embodiment.

FIG. 2 is a diagram illustrating an application of kernel coefficients to image signal values, according to an embodiment. In a particular implementation, kernel coefficients 202 may be obtained from determination of a single kernel at a KRN such as KRN 102, for example. Kernel coefficients 202 may be applied to signal intensity values of an image in one or more filtering operations as shown in kernel coefficient application 206. In this context, a "kernel" as referred to herein means a set of organized parameters of a convolution operation to be applied to one or more image signal values expressing an image, such as color intensity values associated with pixel locations in the image, to impart a particular intended effect to the image. Such an intended effect may comprise, for example, blurring, sharpening, embossing, feature detection/extraction (e.g., edge detection), just to provide a few examples. In a particular implementation, a kernel may comprise an ordered array of values (e.g., coefficients in a floating point format) tailored for application to image signal intensity values of a particular dimensionality such as dimensions corresponding to color intensity values and/or pixel location. According to an embodiment, a filtering operation for application of a kernel to signal intensity values of an image may be implemented according to expression (1) as follows:

$$g(x,y)=\omega * f(x,y)=\Sigma_{dx=-a}^{a}\Sigma_{dy=-b}^{b}\omega(dx,dy)f[(x+dx),(y+dy)], \quad (1)$$

where:
f(x,y) are image signal intensity values to represent an original image at pixel locations x,y of the original image;
ω is an expression of a kernel defined over a range −a≤dx≤a and −b≤dy≤b; and
g(x,y) are image signal intensity values to represent an image at pixel locations x,y processed according to kernel ω processed image.

In the particular implementation of FIG. 2, a single kernel to be applied to image signal intensity values depicted in kernel coefficient application 206 may be defined to have K×K coefficients for each color at each particular pixel location (e.g., for application to signal intensity values of a K×K signal values associated with pixel locations centered about the particular pixel location) of H×W total pixel values. As depicted in the particular example of FIG. 2, K=3 such that nine coefficients are to be applied to image signals for determination of an image signal intensity value a particular location based, at least in part, on image signal intensity values at neighboring pixel locations in a 3×3 pattern. According to an embodiment, a KRN (e.g., KRN 102) may compute multiple, separable kernels to be applied to image signal intensity values such that a total number of kernel coefficients to be applied in a light-weight filtering operation of a KPN (e.g., light-weight filtering portion 152) may be significantly reduced.

In the particular example implementation of FIG. 2, image signal values may be organized for color channels including red pixel channel 208, blue pixel channel 210 and green pixel channel 212. Nine kernel coefficients 204 obtained from kernel coefficients 202 may be applied to image signal intensity values in a 3×3 pattern centered at green pixel 214 including green pixels 214 and 216 to impart an intended effect to an image signal intensity value at green pixel 214. Similarly, for each pixel in green pixel channel 212, an associated nine kernel coefficients obtained from kernel coefficients may be applied to image signal values neighboring the additional green pixel to impart an intended effect. Likewise, for each pixel in red pixel channel 208 and blue pixel channel 210, an associated nine kernel coefficients obtained from kernel coefficients may be applied to image signal values neighboring the pixel to impart an intended effect. In the particular example implementation of FIG. 3, a KRN may compute separable kernels for a horizontal filtering operation and a vertical filtering operation. Such separable operations to apply kernel coefficients may be applied in multiple convolution operations according to expression (2) as follows:

$$g(x,y)=\omega_H * [\omega_V * f(x,y)] \quad (2)$$

$$g(x,y)=\Sigma_{dx=-a}^{a}\omega_H(dx,y)\{\Sigma_{dy=-b}^{b}\omega_V(x,dy)f(x+dx,y+dy)\}$$

where:

$\omega_H$ is an expression of a first kernel defined over a horizontal range of pixel locations $-a \leq dx \leq a$; and $\omega_V$ is an expression of a second kernel defined over a vertical range of pixel locations $-b \leq dy \leq b$.

Figure 3:
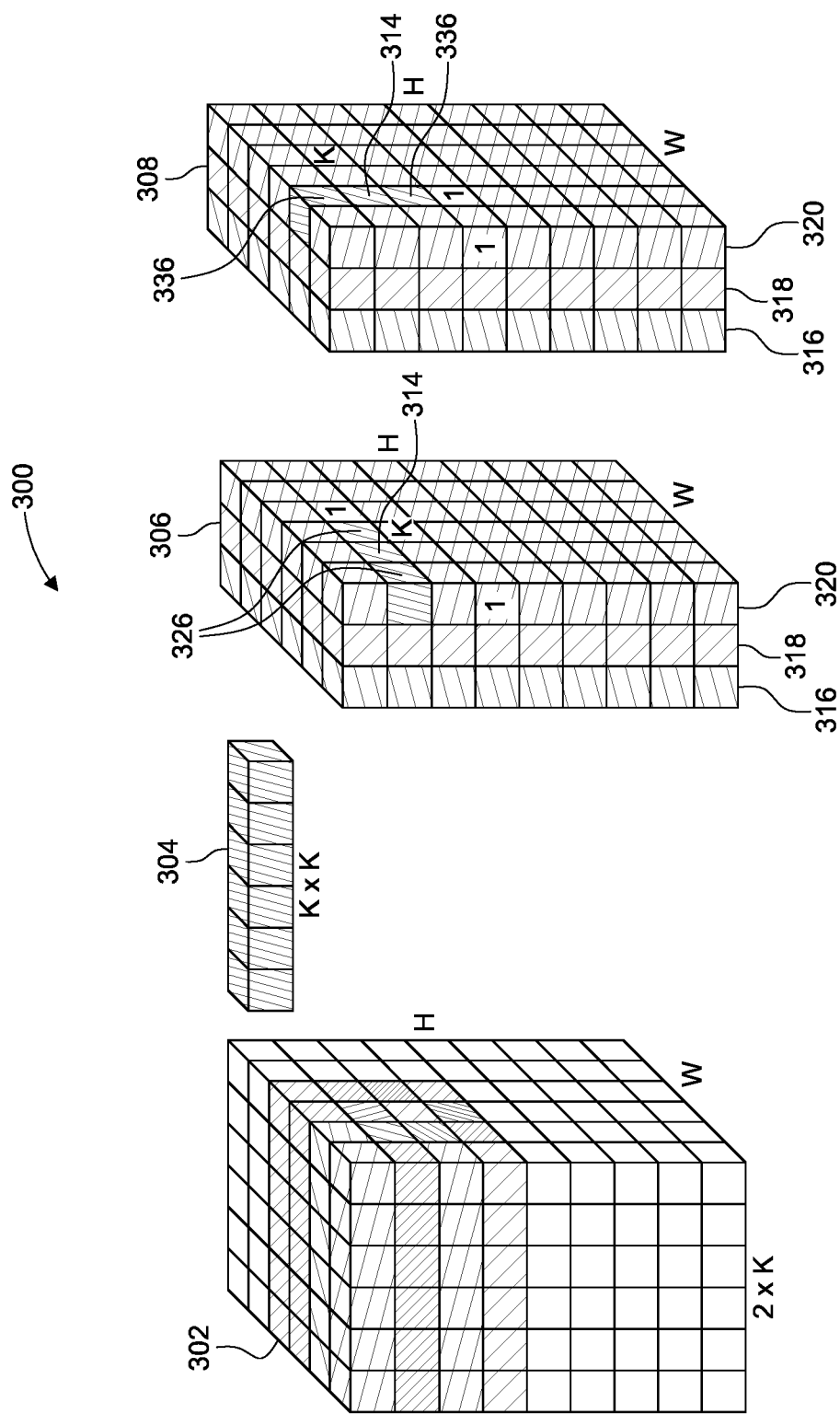
FIG. 3 is a diagram illustrating an application of kernel coefficients to image signal intensity values, according to an alternative embodiment.

In a particular implementation, a KRN may determine coefficients for $\omega_H$ and $\omega_V$ in NN prediction operations in a manner that coefficients for $\omega_H$ and $\omega_V$ are separable. As shown in FIG. 3, an operation to impart an intended effect to an image signal intensity value of an image at a particular pixel location may entail application of a total K+K or 2K coefficients, K coefficients applied in a horizontal filtering operation at 306 and K coefficients applied in a vertical filtering operation 308.

In the particular example implementation of FIG. 3, image signal intensity values may be organized for color channels including red pixel channel 316, blue pixel channel 318 and green pixel channel 320. Six kernel coefficients 304 obtained from kernel coefficients 302 may be applied to image signal intensity values in a row of pixels and a column of pixels centered at green pixel 314. Three of the six kernel coefficients 304 may be derived from a first kernel that is to be applied in a horizontal filtering operation 306 to image signal intensity values of a row of pixels containing green pixels 314 and 326. A different three of the six kernel coefficients 304 may be derived from a second kernel that is to be applied in a vertical filtering operation 308 to image signal intensity values of a column of pixels containing green pixels 314 and 336. Similarly, for each pixel in green pixel channel 320, an associated six kernel coefficients obtained from kernel coefficients 302 may be applied in horizontal and vertical filtering operations to image signal values neighboring the additional green pixel to impart an intended effect. Likewise, for each pixel in red pixel channel 316 and blue pixel channel 318, an associated six kernel coefficients obtained from kernel coefficients 302 may be applied in horizontal and vertical filtering operations to image signal values neighboring the additional pixel to impart an intended effect.

In the particular example of application of coefficients to pixel values of pixels in a K×K region centered about a pixel region of FIG. 3, a total number of coefficients may be reduced from K×K to K+K. For an H×W pixel array, this may achieve a reduction in coefficients at a filter stage from H×W (K×K) to H×W (K+K), for example.

Figure 4:
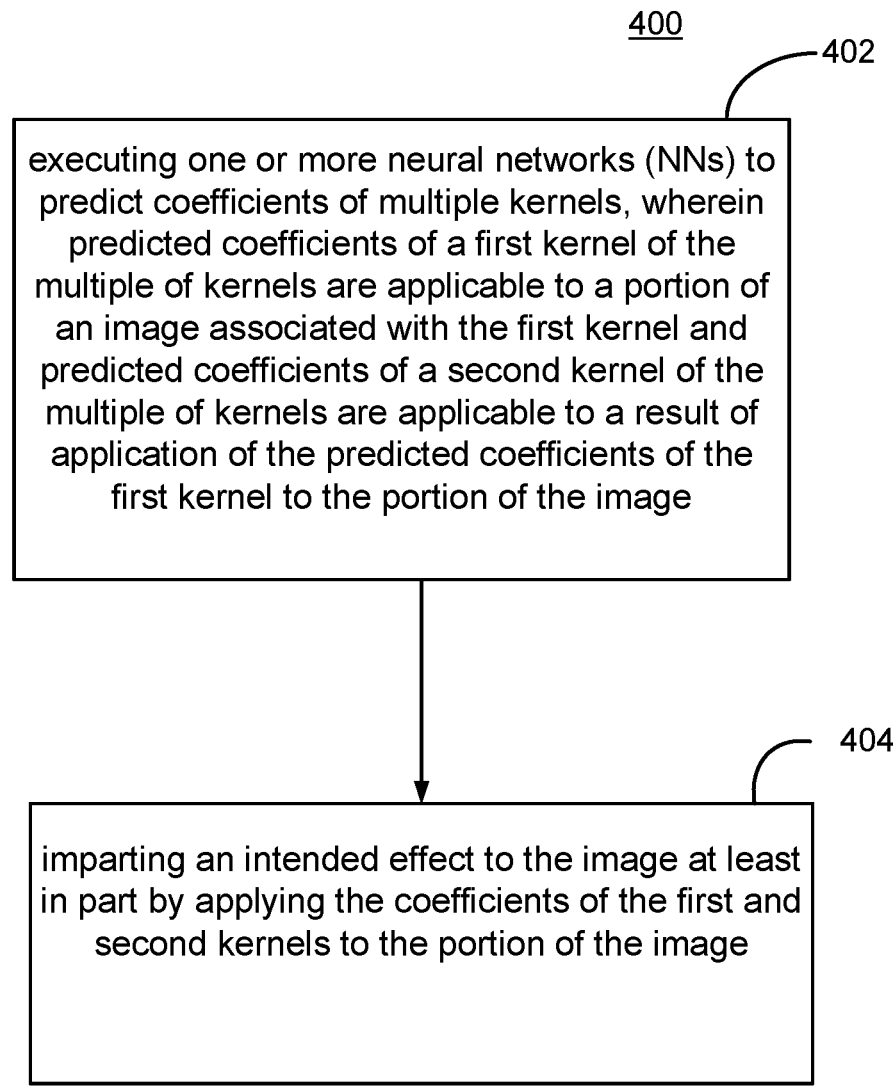
FIG. 4 is a flow diagram of a process to determine coefficients for a kernel to be applied to image signal intensity values, according to an embodiment.

FIG. 4 is a flow diagram of a process 400 to impart an intended effect to an image, according to an embodiment. Block 402 may comprise executing one or more NNs to predict coefficients of multiple kernels to be applicable to different portions of the image to be processed. In the particular example implementation of FIG. 3, block 402 may comprise execution of a NN (e.g., by KRN 102) to predict kernel coefficients in a first one-dimensional array for application in a horizontal filtering operation (e.g., for application to image signal intensity values at pixel locations 314 and 326) and to predict kernel coefficients in a second one-dimensional array for application in a vertical filtering operation (e.g., for application to image signal intensity values at pixel locations 314 and 336). Block 404 may comprise application of one or more convolution operations to apply kernel coefficients determined at block 402 according to expression (2). In the particular example of FIG. 3, block 404 may impart an intended effect to an image signal intensity value associated with a pixel location of an image by application of a first one-dimensional array at horizontal filtering operation (applying the first one-dimensional array of kernel coefficients to image signal intensity values a row including pixels 314 and 326) and application of a second one-dimensional array at vertical filtering operation 308 (applying the second one-dimensional array of kernel coefficients to image signal intensity values at pixels in a column including pixels 314 and 336). In a particular implementation, block 402 may determine a number of kernel coefficients in a first one-dimensional array of kernel coefficients applied in a horizontal filtering operation to equal a number of kernel coefficients in a second one-dimensional array applied in a vertical filtering operation. In another particular implementation, block 402 may comprise executing a NN to generate a plurality of first one-dimensional arrays of kernel coefficients applicable to impart an intended effect to an associated plurality of pixel values in the image; and to generate a plurality of second one-dimensional arrays of kernel coefficients to impart the intended effect to the associated plurality of pixel values.

According to an embodiment, a neural network may comprise a graph comprising nodes to model neurons in a brain. In this context, a "neural network" as referred to herein means an architecture of a processing device defined and/or represented by a graph including nodes to represent neurons that process input signals to generate output signals, and edges connecting the nodes to represent input and/or output signal paths between and/or among the neurons represented by the graph. In particular implementations, a neural network may comprise a biological neural network, made up of real biological neurons, or an artificial neural network, made up of artificial neurons, for solving artificial intelligence (AI) problems, for example. In an implementation, such an artificial neural network may be implemented on one or more computing devices such as computing devices shown in FIG. 5. In a particular implementation, numerical weights associated with edges to represent input and/or output paths may reflect gains to be applied and/or whether an associated connection between connected nodes is to be excitatory (e.g., weight with a positive value) or inhibitory connections (e.g., weight with negative value). In an example implementation, an artificial neuron may apply a weight to input signals, and sum weighted input signals to generate a linear combination.

Edges in a neural network connecting nodes may model synapses capable of transmitting signals (e.g., represented by real number values) between neurons. Receiving such a signal at a node in a neural network, the node may perform some computation to generate an output signal (e.g., to be provided to another node in the neural network connected by an edge) based, at least in part, on one or more weights and/or numerical coefficients associated with the node and/or edges providing the output signal. In a particular implementation of a training mode, such weights and/or numerical coefficients may be adjusted and/or updated as learning progresses. For example, such a weight may increase or decrease a strength of an output signal. In an implementation, transmission of an output signal from a node in a neural network may be inhibited if a strength of the output signal does not exceed a threshold value.

According to an embodiment, a neural network may be structured in layers such that a node in a particular neural network layer may receive output signals from one or more nodes in a previous layer in the neural network, and provide an output signal to one or more nodes in a subsequent layer in the neural network. One specific class of layered neural networks may comprise a convolutional neural network (CNN) or space invariant artificial neural network (SIANN) that enables deep learning. Such CNNs and/or SIANNs may be based on a shared-weight architecture of convolution kernels that shift over input features and provide translation equivariant responses. Such CNNs and/or SIANNs may be applied to image and/or video recognition, recommender systems, image classification, image segmentation, medical image analysis, natural language processing, brain-computer interfaces, financial time series, just to provide a few examples.

In particular implementations, neural networks may enable improved results in a wide range of tasks, including image recognition, speech recognition, just to provide a couple of example applications. To enable performing such tasks, features of a neural network (e.g., nodes, edges, weights, layers of nodes and edges) may be structured and/or configured to form "filters" that may have a measurable/numerical state such as a value of an output signal. Such a filter may comprise nodes and/or edges arranged in "paths" and are to be responsive to sensor observations provided as input signals. In an implementation, a state and/or output signal of such a filter may indicate and/or infer detection of a presence or absence of a feature in an input signal.

According to an embodiment KPN 100 may be formed by and/or expressed, in whole or in part, in transistors and/or lower metal interconnects (not shown) in processes (e.g., front end-of-line and/or back-end-of-line processes) such as processes to form complementary metal oxide semiconductor (CMOS) circuitry, just as an example. It should be understood, however that this is merely an example of how circuitry may be formed in a device in a front end-of-line process, and claimed subject matter is not limited in this respect.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented to include, but not be limited to, formats supporting behavioral languages such as C, Verilog, and VHDL, formats supporting register level description languages like RTL, formats supporting geometry description languages such as GDSII, GDSIII, GDSIV, CIF, MEBES and any other suitable formats and languages. Storage media in which such formatted data and/or instructions may be embodied to include, but not be limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves may include, but not be limited to, transfers (uploads, downloads, e-mail, etc.) over the Internet and/or other computer networks via one or more electronic communication protocols (e.g., HTTP, FTP, SMTP, etc.).

If received within a computer system via one or more machine-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process (e.g., wafer fabrication process).

In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

For one or more embodiments, KPN 100 may be implemented in a device, such as a computing device and/or networking device, that may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IoT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

In the context of the present patent application, the term "connection," the term "component" and/or similar terms are intended to be physical but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

In the context of the present patent application, the terms "entry," "electronic entry," "document," "electronic document," "content", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term "parameters" (e.g., one or more parameters), "values" (e.g., one or more values), "symbols" (e.g., one or more symbols) "bits" (e.g., one or more bits), "elements" (e.g., one or more elements), "characters" (e.g., one or more characters), "numbers" (e.g., one or more numbers), "numerals" (e.g., one or more numerals) or "measurements" (e.g., one or more measurements) refer to material descriptive of a collection of signals, such as in one or more electronic documents and/or electronic files, and exist in the form of physical signals and/or physical states, such as memory states. For example, one or more parameters, values, symbols, bits, elements, characters, numbers, numerals or measurements, such as referring to one or more aspects of an electronic document and/or an electronic file comprising an image, may include, as examples, time of day at which an image was captured, latitude and longitude of an image capture device, such as a camera, for example, etc. In another example, one or more parameters, values, symbols, bits, elements, characters, numbers, numerals or measurements, relevant to digital content, such as digital content comprising a technical article, as an example, may include one or more authors, for example. Claimed subject matter is intended to embrace meaningful, descriptive parameters, values, symbols, bits, elements, characters, numbers, numerals or measurements in any format, so long as the one or more parameters, values, symbols, bits, elements, characters, numbers, numerals or measurements comprise physical signals and/or states, which may include, as parameter, value, symbol bits, elements, characters, numbers, numerals or measurements examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public. According to an embodiment, a signal packet and/or frame may comprise all or a portion of a "message" transmitted between devices. In an implementation, a message may comprise signals and/or states expressing content to be delivered to a recipient device. For example, a message may at least in part comprise a physical signal in a transmission medium that is modulated by content that is to be stored in a non-transitory storage medium at a recipient device, and subsequently processed.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

Figure 5:
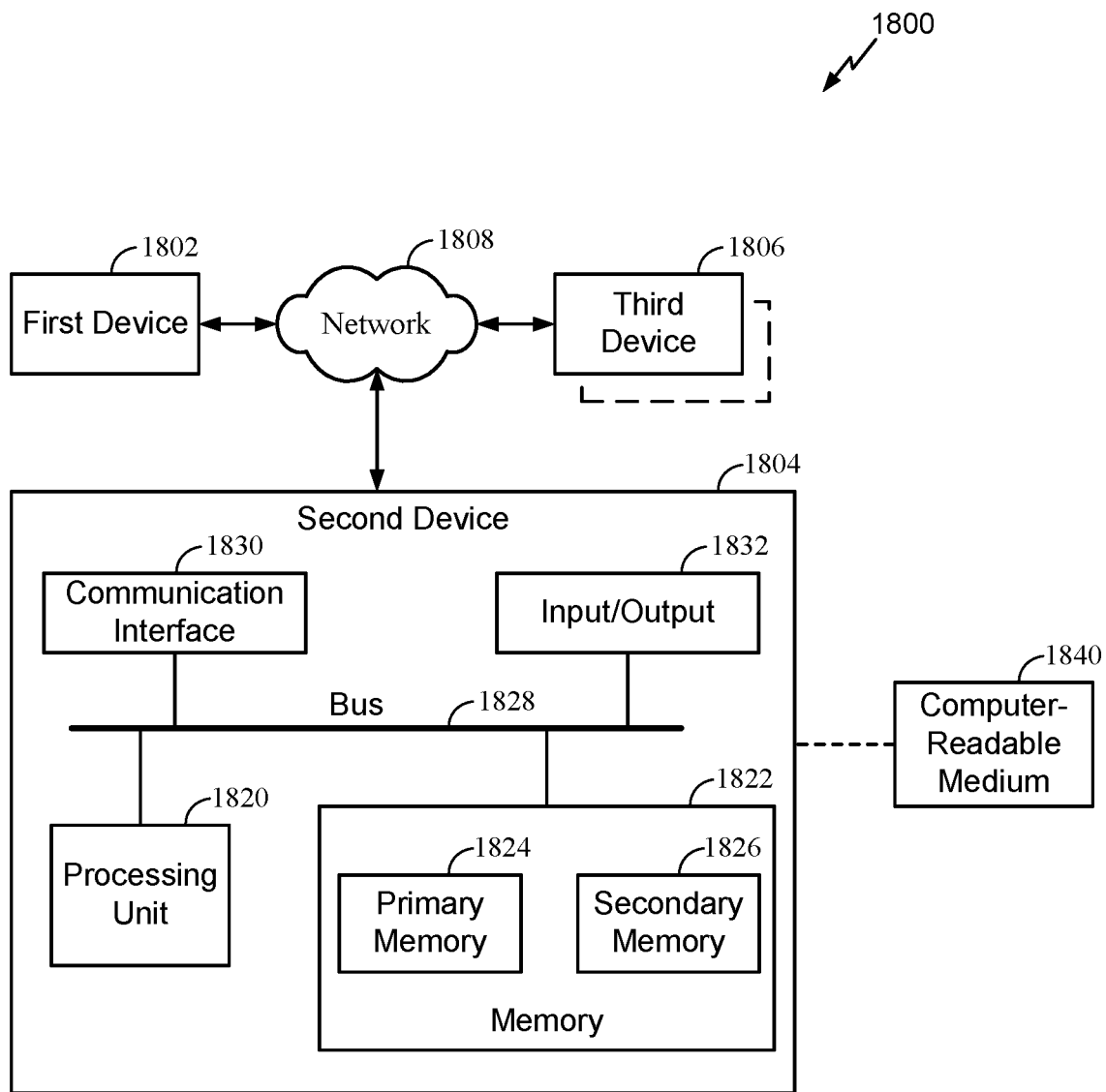
FIG. 5 is a schematic block diagram of an example computing system in accordance with an implementation.

FIG. 5 shows an embodiment 1800 of a system that may be employed to implement either type or both types of networks. Network 1808 may comprise one or more network connections, links, processes, services, applications, and/or resources to facilitate and/or support communications, such as an exchange of communication signals, for example, between a computing device, such as 1802, and another computing device, such as 1806, which may, for example, comprise one or more client computing devices and/or one or more server computing device. By way of example, but not limitation, network 1808 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 5 may comprise features, for example, of a client computing device and/or a server computing device, in an embodiment. It is further noted that the term computing device, in general, whether employed as a client and/or as a server, or otherwise, refers at least to a processor and a memory connected by a communication bus. A "processor" and/or "processing circuit" for example, is understood to connote a specific structure such as a central processing unit (CPU), digital signal processor (DSP), graphics processing unit (GPU) and/or neural network processing unit (NPU), or a combination thereof, of a computing device which may include a control unit and an execution unit. In an aspect, a processor and/or processing circuit may comprise a device that fetches, interprets and executes instructions to process input signals to provide output signals. As such, in the context of the present patent application at least, this is understood to refer to sufficient structure within the meaning of 35 USC § 112 (f) so that it is specifically intended that 35 USC § 112 (f) not be implicated by use of the term "computing device," "processor," "processing unit," "processing circuit" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIG. 1 through FIG. 4 and in the text associated with the foregoing figure(s) of the present patent application.

Referring now to FIG. 5, in an embodiment, first and third devices 1802 and 1806 may be capable of rendering a graphical user interface (GUI) for a network device and/or a computing device, for example, so that a user-operator may engage in system use. Device 1804 may potentially serve a similar function in this illustration. Likewise, in FIG. 5, computing device 1802 ('first device' in figure) may interface with computing device 1804 ('second device' in figure), which may, for example, also comprise features of a client computing device and/or a server computing device, in an embodiment. Processor (e.g., processing device) 1820 and memory 1822, which may comprise primary memory 1824 and secondary memory 1826, may communicate by way of a communication bus 1815, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 1804, as depicted in FIG. 5, is merely one example, and claimed subject matter is not limited in scope to this particular example. FIG. 5 may further comprise a communication interface 1830 which may comprise circuitry and/or devices to facilitate transmission of messages between second device 1804 and first device 1802 and/or third device 1806 in a physical transmission medium over network 1808 using one or more network communication techniques identified herein, for example. In a particular implementation, communication interface 1830 may comprise a transmitter device including devices and/or circuitry to modulate a physical signal in physical transmission medium according to a particular communication format based, at least in part, on a message that is intended for receipt by one or more recipient devices. Similarly, communication interface 1830 may comprise a receiver device comprising devices and/or circuitry demodulate a physical signal in a physical transmission medium to, at least in part, recover at least a portion of a message used to modulate the physical signal according to a particular communication format. In a particular implementation, communication interface may comprise a transceiver device having circuitry to implement a receiver device and transmitter device.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IoT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, GNSS receiver and/or other location-identifying type capability, and/or a display with a higher degree of functionality, such as a touch-sensitive color 5D or 3D display, for example.

In FIG. 5, computing device 1802 may provide one or more sources of executable computer instructions in the form physical states and/or signals (e.g., stored in memory states), for example. Computing device 1802 may communicate with computing device 1804 by way of a network connection, such as via network 1808, for example. As previously mentioned, a connection, while physical, may not necessarily be tangible. Although computing device 1804 of FIG. 5 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1822 may comprise any non-transitory storage mechanism. Memory 1822 may comprise, for example, primary memory 1824 and secondary memory 1826, additional memory circuits, mechanisms, or combinations thereof may be used. Memory 1822 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1822 may be utilized to store a program of executable computer instructions. For example, processor 1820 may fetch executable instructions from memory and proceed to execute the fetched instructions. Memory 1822 may also comprise a memory controller for accessing device readable-medium 1840 that may carry and/or make accessible digital content, which may include code, and/or instructions, for example, executable by processor 1820 and/or some other device, such as a controller, as one example, capable of executing computer instructions, for example. Under direction of processor 1820, a non-transitory memory, such as memory cells storing physical states (e.g., memory states), comprising, for example, a program of executable computer instructions, may be executed by processor 1820 and able to generate signals to be communicated via a network, for example, as previously described. Generated signals may also be stored in memory, also previously suggested.

Memory 1822 may store electronic files and/or electronic documents, such as relating to one or more users, and may also comprise a computer-readable medium that may carry and/or make accessible content, including code and/or instructions, for example, executable by processor 1820 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, samples, observations, weights, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 5, processor 1820 may comprise one or more circuits, such as digital circuits, to perform at least a portion of a computing procedure and/or process. By way of example, but not limitation, processor 1820 may comprise one or more processors, such as controllers, microprocessors, microcontrollers, application specific integrated circuits, digital signal processors (DSPs), graphics processing units (GPUs), neural network processing units (NPUs), programmable logic devices, field programmable gate arrays, the like, or any combination thereof. In various implementations and/or embodiments, processor 1820 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 5 also illustrates device 1804 as including a component 1832 operable with input/output devices, for example, so that signals and/or states may be appropriately communicated between devices, such as device 1804 and an input device and/or device 1804 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:
1. A method comprising:
   executing one or more neural networks (NNs) to predict coefficients of multiple kernels, wherein predicted coefficients of a first kernel of the multiple of kernels are applicable to a portion of an image associated with the first kernel and predicted coefficients of a second kernel of the multiple of kernels are applicable to a result of application of the predicted coefficients of the first kernel to the portion of the image;
   storing the predicted coefficients of the first kernel and the second kernel in a memory; and
   imparting an intended effect to the image at least in part by applying the stored predicted coefficients of the first and second kernels to the portion of the image.

2. The method of claim 1, wherein the portion of the image is disposed over a predefined patch in the image.

3. The method of claim 1, wherein
imparting the intended effect to the image at least in part by applying the stored predicted coefficients of the first and second kernels to the portion of the image further comprises:
applying the stored predicted coefficients of the first kernel to image signal values associated with pixel locations in the portion of the image to provide resulting image signal intensity values; and
applying the stored predicted coefficients of the second kernel to the resulting image signal intensity values to impart an intended effect to the portion of the image.

4. The method of claim 1, wherein:
the predicted coefficients of the first kernel comprise a first one-dimensional array and the predicted coefficients of the second kernel comprise a second one-dimensional array, and wherein
imparting the intended effect to the image further comprises:
applying the first one-dimensional array of kernel coefficients to image pixel intensity values of a row in the portion of the image to provide output image signal intensity values associated with pixel locations in the portion of the image; and
applying the second one-dimensional array of kernel coefficients to a column in the output image signal intensity values.

5. The method of claim 4, wherein a number of kernel coefficients in the first one-dimensional array of kernel coefficients equals a number of columns of the portion of the image and a number of kernel coefficients in the second one-dimensional array of kernel coefficients equals a number of rows of the portion of the image.

6. The method of claim 1, wherein executing the one or more NNs further comprises:
generating a plurality of first one-dimensional arrays of kernel coefficients applicable to image signal values of an associated plurality of pixel locations in the image to generate output image signal intensity values; and
generating a plurality of second one-dimensional arrays of kernel coefficients applicable to the generated output image signal intensity values to impart an intended effect to the image signal values of the associated plurality of pixel locations.

7. The method of claim 1, wherein predicted coefficients of the first and second kernels are applicable to impart a first intended effect in a first color channel of the portion of the image, and wherein the predicted coefficients further comprise predicted coefficients of third and four kernels applicable to impart a second intended effect to a second color channel of the portion of the image.

8. A method comprising:
storing coefficients of first and second kernels to a memory; and
applying the stored coefficients of the first and second kernels to image signal intensity values associated with pixel locations in a portion of an image to impart an intended effect to the image, wherein:
the coefficients of the first and second kernels are predicted from execution of one or more neural networks (NNs); and
applying the coefficients of the first and second kernels further comprises:
applying coefficients of the first kernel to image signal intensity values associated with at least some of the pixel locations in the portion of the image to provide a result; and
applying coefficients of the second kernel to the result to provide an output image signal intensity value.

9. The method of claim 8, wherein:
predicted coefficients of the first kernel comprise a first one-dimensional array and predicted coefficients of the second kernel comprise a second one-dimensional array, and the method further comprises:
applying the first one-dimensional array of kernel coefficients to image signal intensity values associated with pixel locations a row in the portion of the image to provide output image signal intensity values associated with pixel locations in the portion of the image; and
applying the second one-dimensional array of kernel coefficients to image signal intensity values associated with pixel values in a column in the output image signal intensity values.

10. The method of claim 9, wherein a number of kernel coefficients in the first one-dimensional array of kernel coefficients equals a number of columns of the portion of the image and a number of kernel coefficients in the second one-dimensional array of kernel coefficients equals a number of rows of the portion of the image.

11. An apparatus comprising:
one or more storage devices;
one or more processors coupled to the one or more storage devices to:
execute one or more neural networks (NNs) to predict coefficients of multiple kernels, wherein predicted coefficients of a first kernel of the multiple of kernels to be applicable to a portion of an image associated with the first kernel and predicted coefficients of a second kernel of the multiple of kernels to be applicable to a result of application of the predicted coefficients of the first kernel to the portion of the image;
store the predicted coefficients of the first kernel and the second kernel in the one or more storage devices; and
impart an intended effect to the image at least in part by application of the stored predicted coefficients of the first and second kernels to the portion of the image.

12. The apparatus of claim 11, wherein the portion of the image to be disposed over a predefined patch in the image.

13. The apparatus of claim 11, wherein execution of the one or more NNs comprises:
generation of a plurality of first one-dimensional arrays of kernel coefficients to be applicable to an associated plurality of pixel values in the image to generate output image signal intensity values; and
generation of a plurality of second one-dimensional arrays of kernel coefficients to be applicable to the generated output image signal intensity values to impart an intended effect to the associated plurality of pixel values.

14. The apparatus of claim 13, wherein a number of kernel coefficients in at least one of the plurality of first one-dimensional arrays of kernel coefficients to equal a number of columns of the portion of the image and a number of kernel coefficients in at least one of the second one-dimensional arrays of kernel coefficients to equal a number of rows of the portion of the image.

15. The apparatus of claim 11, wherein predicted coefficients of the first and second kernels to be applicable to impart a first intended effect in a first color channel of the portion of the image, and wherein the predicted coefficients further comprise predicted coefficients of third and four kernels to be applicable to impart a second intended effect to a second color channel of the portion of the image.

16. An article comprising:
a non-transitory storage medium comprising computer-readable instructions stored thereon which are executable by one or more processors of a computing device to:
execute one or more neural networks (NNs) to predict coefficients of multiple kernels, wherein predicted coefficients of a first kernel of the multiple of kernels to be applicable to a portion of an image associated with the first kernel and predicted coefficients of a second kernel of the multiple of kernels to be applicable to a result of application of the predicted coefficients of the first kernel to the portion of the image;
store the predicted coefficients of the first kernel and the second kernel in a memory; and
impart an intended effect to the image at least in part by application of the stored predicted coefficients of the first and second kernels to the portion of the image.

17. The article of claim 16, wherein the portion of the image to be disposed over a predefined patch in the image.

18. The article of claim 16, wherein execution of the one or more NNs comprises:

generation of a plurality of first one-dimensional arrays of kernel coefficients to be applicable to an associated plurality of pixel values in the image to generate output image signal intensity values; and
generation of a plurality of second one-dimensional arrays of kernel coefficients to be applicable to the generated output image signal intensity values to impart an intended effect to the associated plurality of pixel values.

19. The article of claim 18, wherein a number of kernel coefficients in at least one of the first one-dimensional arrays of kernel coefficients equals a number of columns of the portion of the image and a number of kernel coefficients in at least one of the second one-dimensional arrays of kernel coefficients equals a number of rows of the portion of the image.

20. The article of claim 16, wherein predicted coefficients of the first and second kernels to be applicable to impart a first intended effect in a first color channel of the portion of the image, and wherein the predicted coefficients further comprise predicted coefficients of third and four kernels to be applicable to impart a second intended effect to a second color channel of the portion of the image.

* * * * *